United States Patent [19]

Kurihara et al.

[11] Patent Number: 5,318,729
[45] Date of Patent: Jun. 7, 1994

[54] THIRD-ORDER NONLINEAR OPTICAL MAIN CHAIN POLYMER MATERIAL AND METHOD FOR PREPARING THE SAME

[75] Inventors: Takashi Kurihara; Michiyuki Amano; Yuhei Mori; Satoru Tomaru; Toshikuni Kaino, all of Mito, Japan

[73] Assignee: Nippon Telegraph and Telephone Corporation, Tokyo, Japan

[21] Appl. No.: 734,257

[22] Filed: Jul. 22, 1991

[30] Foreign Application Priority Data

Jul. 24, 1990 [JP] Japan .................. 2-193936

[51] Int. Cl.$^5$ .......................... F21V 9/00; G02B 6/00
[52] U.S. Cl. ........................ 252/582; 359/329
[58] Field of Search ............. 359/326, 329; 252/582, 252/600, 299.01

[56] References Cited

U.S. PATENT DOCUMENTS

| | | | |
|---|---|---|---|
| 4,128,497 | 12/1978 | Cole, Jr. et al. | 252/582 |
| 4,997,595 | 3/1991 | Kurihara et al. | 252/582 |
| 5,001,209 | 3/1991 | Wreesmann et al. | 252/582 |
| 5,011,623 | 4/1991 | Yoshinaga et al. | 252/582 |

OTHER PUBLICATIONS

Nonlinear Optical Devices for Switching Applications, Tetsuhiko Ikegami and Ken'ichi Kubodera Oyo Butsuri (Applied Physics) vol. 59, p. 155, 1990.
An Ultrafast Light Gate, Applied Physics Letters, vol. 15, No. 6, Sep. 15, 1969.
Recent Technologies on Generation/Processing of Ultrahigh Speed Optical Pulses, Masatoshi Saruwatari, Denki Gakkai Tsushinki OCS88-46, 37 (1988).
$Z^{(3)}$ Evaluation For the Molecular Crystals of 4-(N-,N-Diethylamino)-4'-Nitrostilbene (Deans), Takashi Kurihara, et al., Chemical Physics Letters, vol. 165, No. 2, 3, Jan. 12, 1990.
Nonlinear Optical Properties of an Azo Dye Attached Polymer, Shiro Matsumoto, et al.

*Primary Examiner*—Philip Tucker
*Attorney, Agent, or Firm*—Kenyon & Kenyon

[57] ABSTRACT

A third-order nonlinear optical main chain polymer material contains a high $\chi^{(3)}$ component having no less than 3 but no more than 7 $\pi$-conjugated bonding groups and having an electron donor in the main chain of the polymer through covalent bonds. The donor is preferably an alkylamino structure, more preferably a dialkylamino structure. Particularly preferred is a diethylamino structure. The high $\chi^{(3)}$ component is preferably a phenylene ring system of which phenylene rings are bonded through azo bonding groups with the phenylene rings and the azo bonding groups being positioned alternately. The polymer main chain is polyurethane or polyester. The third-order nonlinear optical main chain polymer material is prepared by polyaddition of a high $\chi^{(3)}$ compound, i.e., a precursor of the high $\chi^{(3)}$ component, having a hydroxyl group at each end with a diisocyanate compound or by polycondensation of the high $\chi^{(3)}$ compound with a dicarboxylic acid.

22 Claims, 1 Drawing Sheet

THIRD-ORDER NONLINEAR OPTICAL MAIN CHAIN POLYMER MATERIAL AND METHOD FOR PREPARING THE SAME

BACKGROUND OF THE INVENTION

1. Field of the Invention

The present invention relates to a third-order nonlinear optical main chain polymer material and to a method for preparing the same.

2. Description of the Prior Art

When a material is irradiated with a light, the electric polarization, P, of the material induced by an optoelectric field, E, may generally be expressed by the general formula (1) below:

$$P = \chi^{(1)}E + \chi^{(2)}EE + \chi^{(3)}EEE + \ldots \quad (1)$$

where $\chi^{(i)}$ ($i \geq 2$) is called an i-th nonlinear sensitivity. Second harmonic generation (SHG) and third harmonic generation (THG) due to second and third terms, respectively, are well known as wavelength conversion effects. The third term is also important as a factor giving rise to changes in optical constants, for example, nonlinear refractive index effects and nonlinear absorption coefficient effects. In particular, nonlinear refractive index effects relate to change in refractive index of a material which is in proportion to the intensity of an incident light, as represented by the equation (2) below:

$$n = n_0 + n_2 I \quad (2)$$

wherein $n_0$ is a refractive index at a weak light intensity, I is an intensity of incident light, and $n_2$ is a nonlinear refractive index. Nonlinear refractive index, $n_2$, and $\chi^{(3)}$ may be correlated by the equation (3) below:

$$n_2 = (16 \pi^2 / C n_0^2) \chi^{(3)} \quad (3)$$

wherein $n_0$ and $n_2$ are as defined above, and C is the velocity of light (electromagnetic constant).

Both $n_2$ and $\chi^{(3)}$ may be used as indices each indicating a degree of nonlinear optical effect.

By combining a material having this effect with one or more other optical devices such as a Fabry-Perot etalon, a polarizer, and a reflector, it will be possible to realize nonlinear optical devices such as an optical bistable device, an optically gated device, and a phase resonance wave generator. These nonlinear optical devices are hopeful as key devices for future optical computing and optical conversion technology (on nonlinear optical device in general, reference is made to Conf. Lec. of IEEE Int. Conf. Commun, p. 1152 (1990)). Almost all the performances of optical nonlinear devices, i.e., range of wavelength used, strength of input light for operation, response speed, and the like depend on the characteristics of the materials constituting the devices as will be explained by examples below. With respect to details of comparison of materials for nonlinear optical devices, reference is made to Oyo Butsuri (Applied Physics) Vol. 59, p.155, (1990).

GaAs/GaAlAs semiconductor superlattice crystals are based on the mechanism that the refractive index changes depending on the intensity of light due to excitation of exciton as a result of absorption of light in the crystal (absorptional nonlinear effect). Therefore, they are highly effective and require only low incident light intensities for their operation. However, they have disadvantages that the range of wavelength which can be used is limited to a very narrow range near the absorption spectrum of the exciton and that the response time depends on the lifetime of exciton, thus failing to be used in optical signal processing higher than $3 \times 10^{-8}$ sec.

Carbon disulfide ($CS_2$) known as a nonlinear optical liquid is based on the mechanism that the refractive index shows a dependency on the intensity of light applied due to the arrangement of molecules permitting rotation dependent on the optoelectric field applied (molecular rotation nonlinear effect). This is advantageous in that the wavelength range of incident light which can be used is broad enough to cover from visible to near-infrared. However, not only their third nonlinear coefficient is low but also their time response depends on molecular relaxation times, and hence it is impossible to use them in optical signal processing faster than $10^{-11}$ to $10^{-12}$ sec. On the performances of $CS_2$, reference is made to Applied Physics Letters, Vol. 15, p. 192 (1969).

While it has an efficiency by 10 digits lower than those of semiconductor superlattice crystals quartz can be made in the form of fiber to make an optical multiplexer/demultiplexer switch which can be operated with an incident light of several watts (W). However, the length of such quartz fiber must be from 100 to 1,000 m in order for it to be useful, and its response speed has remained at a level at most on the order of $10^{-10}$ sec. because of its increased length. On the details of optical switches using quartz fibers, reference is made to Denki Gakkai Tsushinshi OCS88-46, 37 (1988).

Therefore, there has been a keen demand for developing a material which has a wide wavelength range in which it can be used, has a high third order optical nonlinear efficiency, and enables high speed response on the order of pico second or less.

Among the materials exhibiting nonlinear optical effects, organic materials having $\pi$ electron conjugates which enable high speed response have been given attention. Specific examples of such organic materials include $\pi$ conjugated polymers such as polydiacetylene, polyacetylene, and polyarylenevinylene. The nonlinear optical effects of the organic materials having $\pi$ electron conjugates are purely due to electron polarization unlike semiconductors and dielectrics whose nonlinear optical effects are based on lattice-to-lattice interactions, resulting in a high response speed as high as $10^{-14}$ sec. which makes it possible to follow changes in the intensity of optical signal. For example, when poly(2,4-hexadiyne-1,6-(p-toluenesulfonate)) (abbreviated as "PTS"), one of polydiacetylenes, is used, the input wavelength range which can be used is from about 0.65 μm to 2.0 μm or more, the nonlinear refractive index ($n_2$) is $2 \times 10^{-12}$ (W/cm$^2$)$^{-1}$ which is by 2 digits larger than that of the aforementioned $CS_2$ liquid. Therefore, the organic materials having $\pi$ electron conjugates are most expected among various materials for realizing nonlinear optical devices. On nonlinear optical properties of PTS, reference is made to Physical Review Letters, Vol. 36, p. 956 (1976).

However, many of the $\pi$ conjugated polymers having large $\chi^{(3)}$ values are insoluble and unmeltable, and hence are poorly processable. Even when they can be formed into films, the resulting films have low optical transmittivities because of their rigidity and crystallinity and are poor in their processability into desired optical waveguides and it has been difficult to use them as they are for fabricating various devices. In fact, no nonlinear optical device composed of PTS referred to above having the largest $\chi^{(3)}$ has been realized yet. For the same reason, no device using polyacetylene or polyallylenevinylene has been developed yet.

On the other hand, organic materials having large nonlinear optical effects other than $\pi$ conjugated polymers include donor-acceptor type $\pi$ conjugated molecules. This type of molecule has a relatively short $\pi$-conjugated system with one end thereof substituted with a donor and the other with an acceptor, and the molecule is intended to amplify nonlinear optical effects utilizing intramolecular charge transfer effects generated between the donor and the acceptor. More specifically, diethylaminonitrostilbene (hereafter, abbreviated as DEANS; cf. Chemical Physics Letters, Vol. 165, p. 171 (1990)) and diethylaminonitrostyrene (hereafter, abbreviated as DEANST; cf. U.S. Pat. No. 4,997,595 (1991)) have been known. The donor and acceptor in the aforementioned compounds are a diethylamino group and a nitro group, respectively, while the $\pi$-conjugated system is stilbene in DEANS and styrene in DEANST. The both compounds have $\chi^{(3)}$ values on the order of at most $10^{-12}$ to $10^{-11}$ esu. Particularly, it has been tried to make an optically gated device using a nitrobenzene solution of DEANST which is a nonlinear optical medium superior over $CS_2$, and test its performances. Further, a side chain type polymer is known which consists of a donor-acceptor type $\pi$-conjugated molecule containing azobenzene as a $\pi$-conjugated system and polymethyl methacrylate (hereafter, abbreviated as PMMA) to which the donor-acceptor type $\pi$-conjugated molecule is bonded through a covalent bond as a side chain to form a side chain type polymer and endow it with a desired optical transmittivity. For the first example of nonlinear optical side chain type polymer, reference is made to Applied Physics Letters, Vol. 51, p. 1 (1987). However, the nonlinear optical side chain type polymer has a disadvantage that it has a $\chi^{(3)}$ value by at least one digit smaller than that of the $\pi$-conjugated polymer.

Therefore, in order to realize high speed nonlinear optical devices using organic materials, it is essential to develop a new organic material having a $\chi^{(3)}$ value as large as $\pi$-conjugated polymers and having an acceptable processability and optical transmittivity. To achieve semiconductor laser behavior, it has been desired that $\chi^{(3)}$ should be at least $10^{-10}$ esu, and $10^{-12}$ $(W/cm^2)^{-1}$ as expressed in terms of $n_2$ represented by formula (3) above.

As described above, most of the organic materials having $\chi^{(3)}$ no smaller than $10^{-10}$ esu are $\pi$-conjugated polymers, which are rigid and of high crystallinities, resulting in poor processabilities and low optical transmittivities, thus failing to give sufficient processabilities to desired waveguide structures. On the other hand, nonlinear optical side chain type polymer materials have similar disadvantages that the donor-acceptor type $\pi$-conjugated molecule giving rise to optical nonlinearity has a $\chi^{(3)}$ value smaller than $10^{-10}$ esu, and it has been difficult to introduce the molecule in the polymer material in high concentrations. Nonlinear optical side chain type polymer materials can be produced by a radical copolymerization or a macromolecule reaction of a vinyl monomer having a $\chi^{(3)}$ component. In the radical copolymerization, nitro groups and azo bonds, which are indispensable for increasing the $\chi^{(3)}$ value of the resulting polymer, act as a radical inhibitor, and radical inhibition tends to occur with an increased content of $\chi^{(3)}$ component. As a result, the degree of polymerization remains at a low level, and the polymer obtained has a low film-formability. Hence, it has been difficult to obtain a material having a high concentration of $\chi^{(3)}$ component and an acceptably high processability. For example, the ratio of an introduced $\chi^{(3)}$ component which is disazo or more and has nitro groups and azo bonds in the molecule is at most 10 to 30 mol %. On the other hand, utilization of the macromolecule reaction results in a ratio of introduction of the $\chi^{(3)}$ component of at most about 20 mol %. In addition, the $\chi^{(3)}$ value of the nonlinear optical side chain type polymer material prepared by this macromolecule reaction is found to be at most on the order of about $10^{-11}$ esu.

As described above, conventional nonlinear optical side chain type polymer materials use polymers having high processabilities and high optical transmittivities such as PMMA as a base polymer and hence they have high potentialities of being applied to practical devices but they have a critical disadvantage that their $\chi^{(3)}$ values are by about one digit smaller than $\pi$-conjugated polymers.

SUMMARY OF THE INVENTION

Therefore, it is an object of the present invention to overcome the aforementioned problems, and introduce a component having a high $\chi^{(3)}$ value which is equivalent to or superior over that of $\pi$-conjugated polymers in a polymer in a high ratio of introduction to provide a nonlinear optical organic material having a high optical transmittivity and a high processability.

Another object of the present invention is to provide a method for producing such an organic material.

As a result of intensive investigation, it has now been found that the aforementioned objects of the present invention can be achieved by introducing a high $\chi^{(3)}$ component having a $\chi^{(3)}$ value as high as at least $10^{-10}$ esu in the main chain of a polymer in contrast to the conventional nonlinear optical side chain type polymer materials.

In the first aspect of the present invention, a third-order nonlinear optical main chain polymer material comprises:

a polymer main chain, and a $\chi^{(3)}$ component connected to the polymer main chain through covalent bonds so as to constitute a part of the polymer main chain, the $\chi^{(3)}$ component having no less than 3 but no more than 7 $\pi$-conjugated bonding groups and having ends each substituted with a donor.

Here, the donor may be an alkylamino structure.

The donor may be a dialkylamino structure.

The dialkylamino structure may be a diethylamino structure.

The $\pi$-conjugated bonding group may be one selected from —N=N—, —CH=CH— and —N=CH—.

The $\pi$-conjugated bonding group may be —N=N—.

The $\chi^{(3)}$ component may be substituted with at least one substituent selected from the class consisting of a methyl group, a chlorine atom, a hydroxyl group, a sulfonic group, and an amino group.

The polymer may be one selected from polyurethane and polyester.

The $\chi^{(3)}$ component may be represented by formula (I) below:

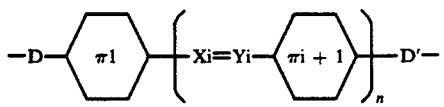

(I)

wherein D and D', which are the same or different, each represent an electron donor; rings represented by:

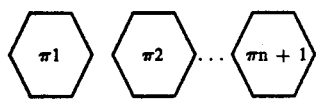

respectively, each represent a π-electron conjugated ring; Xi and Yi, which are the same or different, each represent N or CH; i is a positive integer of 1 to n; and n is a positive integer of 3 to 7.

D and D' may each represent an alkylamino structure.

D and D' may each represent a dialkylamino structure.

The dialkylamino structure may be a diethylamino structure.

At least one of the π-conjugated rings may be substituted with at least one substituent selected from the class consisting of a chlorine atom, a methyl group, a hydroxyl group, a sulfonic acid group and an amino group.

The $\chi^{(3)}$ component may be centrosymmetric.

—Xi=Yi— may be one selected from —N=N—, —CH=CH— and —N=CH—.

—Xi=Yi— may be —N=N—.

The polymer may be one selected from the group consisting of polyurethane and polyester.

In the second aspect of the present invention a method for preparing a third-order nonlinear optical main chain polymer material, comprises the step of:

subjecting (a) a $\chi^{(3)}$ compound having no less than 3 but no more than 7 π-conjugated bonding groups and having ends each substituted with a donor having a hydroxyl group and, (b) a diisocyanate compound to polyaddition to form a polyurethane having a $\chi^{(3)}$ component derived from the $\chi^{(3)}$ compound (a) being incorporated in a main chain of the polyurethane and connected thereto through covalent bonds so as to constitute a part of the main chain.

In the third aspect of the present invention, a method for preparing a third-order nonlinear optical main chain polymer material, comprises the step of:

subjecting (a) a $\chi^{(3)}$ compound having no less than 3 but no more than 7 π-conjugated bonding groups and having ends each substituted with a donor having a hydroxyl group, and (b') a dicarboxylic acid to incorporated polycondensation to form a polyester having a $\chi^{(3)}$ component derived from the $\chi^{(3)}$ compound (a) being in a main chain of said polyester and connected thereto through covalent bonds so as to constitute a part of the main chain.

In the methods according to the second and third aspects of the present invention, the diisocyanate compound may be one selected from the group consisting of methylene diisocyanate and diphenylmethane diisocyanate.

The polyaddition may be carried out in the presence of an n-alkanediol having 2 to 12 carbon atoms.

The nonlinear optical main chain type polymer material has third-order nonlinear optical characteristics such as a high speed and a high efficiency, and thus has a good film-formability and optical transmittivity. Because of this, it will be used as a central material for fabricating nonlinear optical devices in future optical computing and optical exchange technologies. For example, as compared with DEANST described in U.S. Pat. No. 4,997,595, the material of the present invention is excellent. First, the material of the invention can be used in the form of a single spin-coated film in contrast to DEANST which is used as a solution. Second, while DEANST in the form of 30 wt % DEANST-nitrobenzene has a $\chi^{(3)}$ value of $3.6 \times 10^{-12}$ esu inclusive of a molecular orientation effect the material of the present invention has a $\chi^{(3)}$ value of $10^{-10}$ esu, which is by about 30 times as large as that of DEANST.

As a material for optically gated optical switch devices, low $\chi^{(3)}$ materials such as DEANST must be in a continuous form so that they cannot be used unless their propagation losses are extremely low. On the other hand, materials having high $\chi^{(3)}$ values require only shorter optical path lengths and naturally their requirement for propagation loss is not so strict.

Because the propagation loss of the material of the present invention is about 1 dB/cm, the optical path length of 1 cm will make it possible to utilize about 80% of the $\chi^{(3)}$ value effectively. If a waveguide 1 cm in length and 3 μm² in cross-section is fabricated, an optically gated optical switch device can be realized which is driven sufficiently by a semiconductor laser.

As for the operating speed of the device, picosecond switching operation has already been confirmed in a DEANST solution which has a molecular rotation effect on the operation speed. In the material of the present invention without molecular rotation, operation on the order of picosecond or shorter is possible. In addition, the material of the present invention is applicable not only to optically gated optical switch device but also to other important nonlinear optical devices such as an optical bistable device and an optical limiter device.

DETAILED DESCRIPTION OF THE INVENTION

Figure 1:
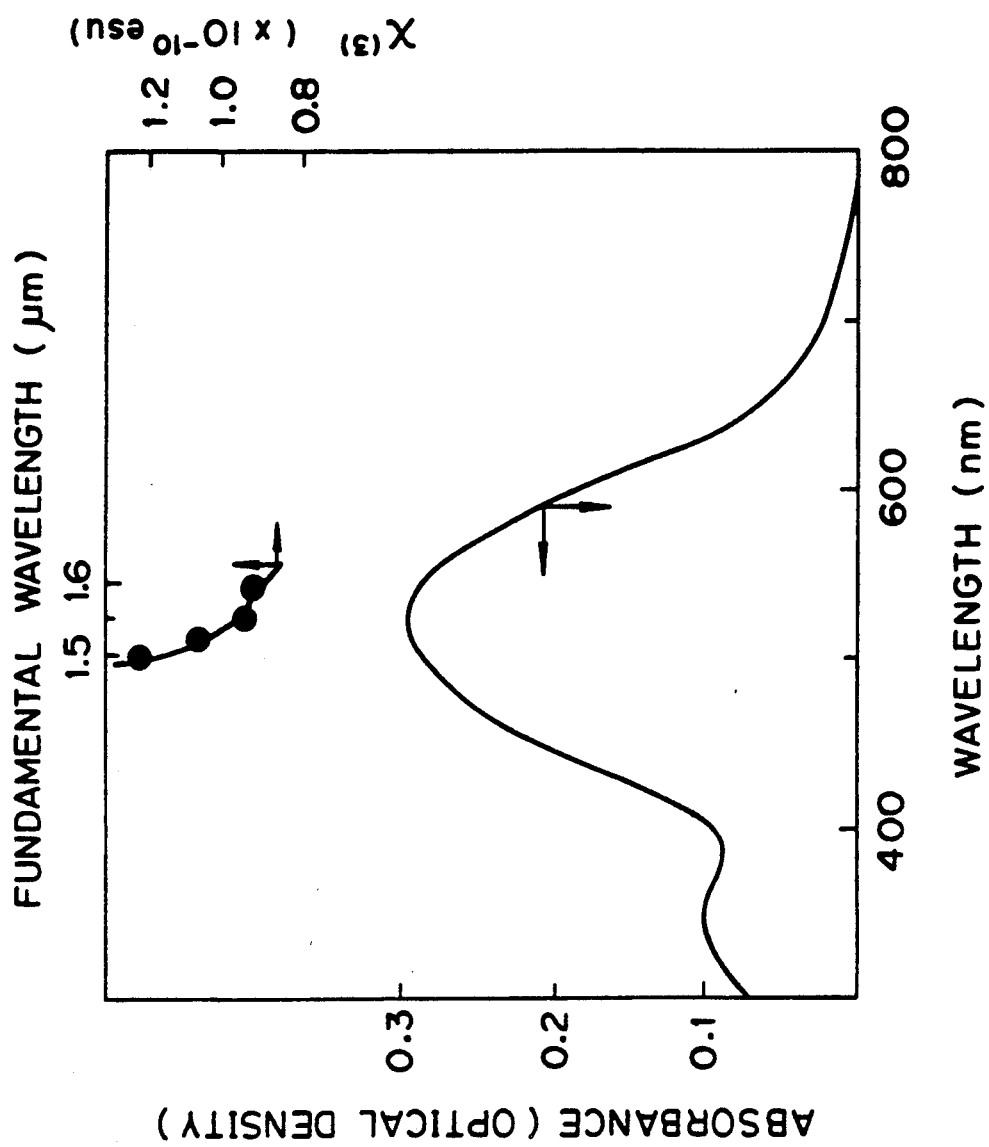
FIG. 1 is a graph illustrating an absorption spectrum and a $\chi^{(3)}$ spectrum around an absorption peak for a polyurethane, i.e., nonlinear optical main chain polymer material, prepared according to Example 1 of the invention.

The $\chi^{(3)}$ component used in the present invention can be derived from a π-conjugated compound preferably having a centrosymmetric structure whose respective ends, are substituted with an electron donor, and which has a $\chi^{(3)}$ value sufficiently exceeding $10^{-10}$ esu. Since the $\chi^{(3)}$ component has been introduced in the main chain of the polymer, the nonlinear optical material of the present invention does not lose its optical transmittivity and film-formability even when the $\chi^{(3)}$ component is present in a ratio of 50 mol %.

Examples of the electron donor present at both ends of the high $\chi^{(3)}$ component include an alkylamino structure, for example, a monoalkylamino structure such as a methylamino structure, an ethylamino structure, or a propylamino structure, a dimethylamino structure such as a dimethylamino structure, a methylethylamino structure, a diethylamino structure, an ethylpropyl structure, or a dipropyl structure. Of these electron donors, preferred is dialkylamino structures, and more preferably a diethylamino structure.

As the π-electron conjugated rings in formula (I) above, more specifically those rings represented by:

i.e., 4 to 8 π-electron conjugated rings:

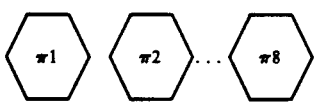

there can be cited, for example, a phenylene ring, a thienylene ring, and a furylene ring. The 4 to 8 rings above may be the same or different one from another. It is preferred that all the π-electron conjugated rings be phenylene rings.

The π-conjugated bonding is selected from —N=N—, —CH=CH— or —N=CH—.

The component represented by formula (I) above does not have to be centrosymmetric in a strict sense but either π-conjugated system or structure or electron donors at both ends may be noncentrosymmetric. However, centrosymmetric ones are preferred.

Any one of the π-electron conjugated rings may be substituted with at least one substituent selected from the class consisting of a chlorine atom, a methyl group, a hydroxyl group, a sulfonic acid group and an amino group, with a methyl group being preferred since it imparts a high film-formability and a high optical transmittivity to the resulting polymer material. The substituents may be the same or different. It is preferred that the component represented by formula (I) above be centrosymmetric taking into consideration the presence of such substituents.

The main chain of the polymer may suitably be a polyurethane chain or a polyester chain.

When the high $\chi^{(3)}$ component is introduced in the main chain of the polymer, a compound represented by formula (II) below:

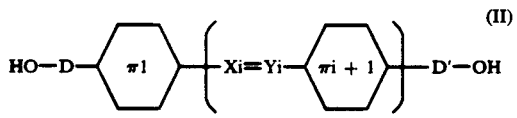

(II)

wherein D and D', which are the same or different, each represent an electron donor; rings represented by:

respectively, each represent a π-electron conjugated ring; Xi and Yi, which are the same or different, each represent N or CH, i is a positive integer of 1 to n; and n is a positive integer of 3 to 7, can be used as a precursor.

Specific examples of the compound represented by formula (II) above include 4,4'-bis[(p-(N-ethyl-N-ethanol)aminophenyl)azo]-azobenzene, 4,4'-bis[(p-(N-ethyl-N-ethanol)aminophenyl)azo]-azostilbene, 4,4'-bis[(p-(N-ethyl-N-ethanol)amino-o-methylphenyl)azo]-azobenzene, 4,4'-bis[(p-(N-ethyl-N-ethanol)aminophenyl)azo]-3,3'-dichloroazobenzene, 2,5-dichloroterephthalyl-bis[4-(p-(N-ethyl-N-ethanol)aminophenyl)azoaniline], 4,4'-bis{4-[(p-(N-ethyl-N-ethanol)amino-o-methylphenyl)azo]-2-methyl-phenylazo}-azobenzene, 4,4'-bis[(p-(N-ethyl-N-ethanol)amino-o-hydroxyphenyl)azo]-azobenzene, 4,4'-bis[(p-(N-ethyl-N-ethanol)aminophenyl)azo]-stilbene-2,2'-disulfonic acid, 4,4'-bis[(p-(N-ethyl-N-ethanol)amino-o-aminophenyl)azo]-stilbene, and the like.

The values represented by formula (II) above are believed to be novel. While they themselves have high $\chi^{(3)}$ components the compounds represented by formula (II) are difficult to be used as they are for the purpose of the present invention because they have poor processabilities for fabricating waveguides.

Polyazo dyes included by the $\chi^{(3)}$ compound represented by formula (II) above have basic structures known as a highly dichroic dye to be mixed with a liquid crystal (cf. U.S. Pat. No. 4,128,497 (1978)). These compounds cannot be used as they are as a raw material for preparing the main chain polymer material of the present invention because they have no hydroxyl group at the ends thereof. As far as the present inventors know the polyazo dyes have never been recognized yet in the art as a class of substances which have large nonlinear optical properties and used as a raw material for preparing materials for fabricating nonlinear optical devices before the present invention. The high $\chi^{(3)}$ components are featured by developing $\chi^{(3)}$ based on a mechanism similar to that of π-conjugated polymers rather than that of conventional donor-acceptor-substituted intramolecular charge transfer compounds.

The high $\chi^{(3)}$ compound represented by formula (II) can be prepared mainly by two methods. One method is to extend π-conjugated system on both sides thereof through π-conjugated bonding groups, —N=N—, —CH=CH— or —CH=N—, and the other to couple donor-acceptor compounds with each other. According to the first method, a double molar amount of a donor-substituted π-conjugated ring, the donor having a hydroxyl group, for example, a benzene derivative having an N-ethyl-N-ethanolamino group in the donor moiety, is connected to a π-conjugated system having the same functional group at each end thereof by substitution reaction. Alternatively, a double molar amount of such a donor-substituted π-conjugated ring (e.g., N-ethyl-N-ethanolaniline) is connected to a bis-diazonium-type π-conjugated system by diazo coupling reaction. According to the second method, a donor-acceptor compound which has a donor at one end thereof and a nitro group at another end is used as a starting material and nitro groups are coupled under reduced conditions to form —N=N— bonding. The donor moiety has a hydroxyl group. For example, a certain high $\chi^{(3)}$ component can be prepared by mixing a tetrahydrofuran solution of donor-acceptor compound with an ethanol solution of sodium hydroxide, heating the mixture under reflux, and adding zinc powder gradually to the mixture.

Substitution of the π-conjugated rings in the high $\chi^{(3)}$ component with one or more substituents such as a methyl group, a chlorine atom, a hydroxyl group, an amino group, and a sulfonic group results increased solubility so that a polymerization reaction can take place with ease. In addition, a methyl group, a chlorine atom, a hydroxyl group and an amino group are effective for preventing the aggregation of pigments which would otherwise cause light scattering and for retaining the uniformity of films. Therefore, the aforementioned substituents are effective for increasing the film-forming property and optical transmittivity of the resulting nonlinear optical main chain polymer material.

The substituents can be introduced in the nonlinear optical main chain polymer material by preparing the high $\chi^{(3)}$ compound using as a starting material a $\pi$-electron conjugated ring having at least one of the aforementioned substituents.

The high $\chi^{(3)}$ compound represented by formula (II) above has been prepared so that it can have a hydroxyl group-containing donor at each end of the molecule, which enables a further reaction with a diisocyanate compound by a polyaddition reaction, or with a dicarboxylic acid by a polycondensation reaction, to readily prepare a main chain polymer material having a polyurethane structure or a polyester structure, respectively, which has the high $\chi^{(3)}$ component derived from a corresponding $\chi^{(3)}$ compound being incorporated in the main chain of the resulting polymer and connected thereto through covalent bonds so as to constitute a part of the main chain of the polymer (polyurethane or polyester).

Generally, the polyaddition reaction proceeds as follows. That is, a high $\chi^{(3)}$ compound having a hydroxyl group at each end thereof and a diisocyanate compound are reacted in a suitable solvent such as tetrahydrofuran (THF), dimethylformamide (DMF), or dimethylacetamide (DMA), in the presence of a catalyst such as di-n-butyltin dilaurate at a temperature of usually from room temperature to about 100° C. The diisocyanate compound may be any one that is used commonly in preparing polyurethanes. Suitable examples of the diisocyanate compound include hexamethylene diisocyanate and diphenylmethane diisocyanate. The dicarboxylic acid may be any one that is usually used in the preparation of polyesters. The dicarboxylic acid may preferably be terephthalic acid or adipic acid.

The nonlinear optical main chain polymer material of the present invention is chemically stable and thin film waveguides having high optical transmittivities can be readily prepared by spin-coating it.

Further, proper selection of the diisocyanate compound and/or dicarboxylic compound and addition of a diol for copolymerization enable controlling the optical transmittivity and/or waveguide formability freely. The diol used for copolymerization may be n-alkanediols having 2 to 12 carbon atoms such as ethanediol, propanediol, hexanediol, decanediol, and dodecanediol. Hexanediol is preferred. The diol may be used usually in an equimolar amount to 20% by mole based on the high $\chi^{(3)}$ component. The molecular weight of the nonlinear optical main chain polymer material of the present invention may be set to a desired value depending on purposes so far as the polymer material has a processability high enough to fabricate waveguide structures.

EXAMPLES

Hereafter, the present invention will be explained in more detail by way of examples. However, the present invention should not be construed as being limited thereto. Nonlinear optical main chain polymer materials in Examples 1 to 23 below were prepared using high $\chi^{(3)}$ compounds A to J, respectively, having centrosymmetric structures inclusive of substituents as shown in Table hereinbelow, and thus had corresponding $\chi^{(3)}$ components in the respective polymers.

Example 1

To a solution of 2.8 g of 4,4'-diaminoazobenzene in 240 ml of acetic acid was added dropwise a solution of 2 g of sodium nitrite in 25 ml sulfuric acid at 5° C. or lower. Water-ethanol (1:1) mixed solution (500 ml) at 5° C. or lower was added thereto. Further, a saturated aqueous solution of sodium acetate was added to adjust the solution to pH=4. At 0° C., a solution of 6 g of N-ethyl-N-ethanolaniline in 20 ml of ethanol was poured in the mixture. The mixture was allowed to react overnight while lowering the reaction temperature gradually down to room temperature. Ethanol was distilled off under reduced pressure to form precipitate. The precipitate was isolated and purified with column chromatography (carrier: dry silica gel; solvent: chloroform) to obtain 200 mg of 4,4'-bis[(p-(N-ethyl-N-ethanol)aminophenyl)azo]-azobenzene (hereafter, referred to also as high $\chi^{(3)}$ compound A). Equimolar amounts of 4,4'-bis[(p-(N-ethyl-N-ethanol)aminophenyl)azo]-azobenzene and hexamethylene diisocyanate were dissolved in tetrahydrofuran (THF), to which were added triethylamine, and di-n-butyltin dilaurate. The mixture was stirred at room temperature for 4 hours and then heated under reflux for 5 hours while stirring. After being cooled, the reaction mixture was poured in a large amount of hexane to precipitate a polyurethane derivative, i.e., the objective nonlinear optical main chain polymer material. After being purified by reprecipitation, the polyurethane derivative was dissolved in anisole, and the anisole solution was coated on a quartz substrate to form a purple polyurethane thin film of 200 Angstroms thick. The $\chi^{(3)}$ value of the polyurethane film was obtained by THG (third harmonic generation)-Maker Fringe method. More specifically, molten quartz having a known THG was measured simultaneously and $\chi^{(3)}$ values were determined from a ratio of the THG of the molten quartz to that of the sample. FIG. 1 shows the measured $\chi^{(3)}$ spectra near the absorption peak of this polymer film. A strong $\chi^{(3)}$ is observed when the fundamental wavelength is the three times the wavelength near the absorption peak. The large $\chi^{(3)}$ is identified as a three-photon-resonance. From FIG. 1, the three-photon resonance $\chi^{(3)}$ of this material is no lower than $10^{-10}$ esu. Also, a laser beam having a wavelength longer than the absorption edge wavelength was passed through a film of 1 μm thick by prism coupling to evaluate dependency of the intensity of scattered light on the length of the waveguide and obtain a propagation loss of 1 dB/cm or lower.

Example 2

To a solution of 3.6 g of 4,4'-diaminostilbene in 240 ml of acetic acid was added dropwise a solution of 2 g of sodium nitrite in 25 ml sulfuric acid at 5° C. or lower. Water-ethanol (1:1) mixed solution (500 ml) at 5° C. or lower was added thereto. Further, a saturated aqueous solution of sodium acetate was added to adjust the solution to pH=4. At 0° C., a solution of 6 g of N-ethyl-N-ethanolaniline in 20 ml of ethanol was poured in the mixture. The mixture was allowed to react overnight while lowering the reaction temperature gradually down to room temperature. Ethanol was distilled off under reduced pressure to form precipitate. The precipitate was isolated and purified with column chromatography (carrier: dry silica gel; solvent: chloroform) to obtain 200 mg of 4,4'-bis[(p-(N-ethyl-N-ethanol)aminophenyl)azo]-azostilbene (hereafter, referred to also as high $\chi^{(3)}$ compound B). Equimolar amounts of 4,4'-bis[(p-(N-ethyl-N-ethanol)aminophenyl)azo]-azostilbene and hexamethylene diisocyanate were dissolved in THF, to which were added triethylamine, and di-n-butyltin dilaurate. The mixture was stirred at room temperature for 4 hours and then heated under reflux for 5 hours while stirring. After being cooled, the reaction mixture was poured in a large amount of hexane to precipitate a polyurethane derivative, i.e., the objective nonlinear optical main chain polymer material. After being purified by reprecipitation, the polyurethane derivative was dissolved in anisole, and the anisole solution was coated on a quartz substrate to form a purple polyurethane thin film of 200 Angstroms thick. The $\chi^{(3)}$ value of the polyurethane thin film was obtained by THG-Maker Fringe method. The three-photon resonance $\chi^{(3)}$ of this material was about $10^{-10}$ esu. Also, the material had a propagation loss of 1 dB/cm or lower in a wavelength region longer than the wavelength of absorption edge.

Example 3

To a solution of 2.8 g of 4,4'-diaminoazobenzene in 240 ml of acetic acid was added dropwise a solution of 2 g of sodium nitrite in 25 ml sulfuric acid at 5° C. or lower. Water-ethanol (1:1) mixed solution (500 ml) at 5° C. or lower was added thereto. Further, a saturated aqueous solution of sodium acetate was added to adjust the solution to pH=4. At 0° C., a solution of 7 g of N-ethyl-N-(2-hydroxyethyl)-m-toluidine in 20 ml of ethanol was poured in the mixture. The mixture was allowed to react overnight while lowering the reaction temperature gradually down to room temperature. Ethanol was distilled off under reduced pressure to form precipitate. The precipitate was isolated and purified with column chromatography (carrier: dry silica gel; solvent: chloroform) to obtain 200 mg of 4,4'-bis[(p-(N-ethyl-N-ethanol)amino-o-methyl-phenyl)azo]-azobenzene (hereafter, referred to also as high $\chi^{(3)}$ compound C). Equimolar amounts of 4,4'-bis[(p-(N-ethyl-N-ethanol)amino-o-methyl-phenyl)azo]-azobenzene and hexamethylene diisocyanate were dissolved in THF, to which were added triethylamine, and di-n-butyltin dilaurate. The mixture was stirred at room temperature for 4 hours and then heated under reflux for 5 hours while stirring. After being cooled, the reaction mixture was poured in a large amount of hexane to precipitate a polyurethane derivative, i.e., the objective nonlinear optical main chain polymer material. After being purified by reprecipitation, the polyurethane derivative was dissolved in anisole, and the anisole solution was coated on a quartz substrate to form a purple polyurethane thin film of 200 Angstroms thick. The $\chi^{(3)}$ value of the polyurethane thin film was obtained by THG-Maker Fringe method. The three-photon resonance $\chi^{(3)}$ of this material was about $10^{-10}$ esu. Also, the material had a propagation loss of 1 dB/cm or lower in a wavelength region longer than the wavelength of absorption edge.

EXAMPLE 4

4-[(p-N-Ethyl-N-ethanol)aminophenyl)azo]-3-chloronitrobenzene (2 g) obtained by extraction of Disperse Red 13 with acetone was dissolved in 150 ml of THF. To this solution was added 2 ml of 12N aqueous sodium hydroxide solution, and the mixture was heated under reflux. While stirring vigorously, 3.4 g of zinc powder was added portionwise, followed by heating under reflux for 5 hours. After completion of the reaction, THF-soluble matter was distilled off under reduced pressure. After ethanol was added to the residue to remove ethanol-soluble raw material therefrom, the residue was isolated and purified with column chromatography (carrier: dry silica gel, solvent: chloroform) to obtain 200 mg of 4,4'-bis[(p-(N-ethyl-N-ethanol)aminophenyl)azo]-3,3'-dichloroazobenzene (hereafter, referred to also as high $\chi^{(3)}$ compound D). Equimolar amounts of 4,4'-bis[(p-(N-ethyl-N-ethanol)aminophenyl)azo]-3,3'-dichloroazobenzene and hexamethylene diisocyanate were dissolved in THF, to which were added triethylamine, and di-n-butyltin dilaurate. The mixture was stirred at room temperature for 4 hours and then heated under reflux for 5 hours while stirring. After being cooled, the reaction mixture was poured in a large amount of hexane to precipitate a polyurethane derivative, i.e., the objective nonlinear optical main chain polymer material. After being purified by reprecipitation, the polyurethane derivative was dissolved in anisole, and the anisole solution was coated on a quartz substrate to form a violet polyurethane thin film of 200 Angstroms thick. The $\chi^{(3)}$ value of the polyurethane thin film was obtained by THG-Maker Fringe method. The three-photon resonance $\chi^{(3)}$ of this material was about $10^{-10}$ esu. Also, the material had a propagation loss of 1 dB/cm or lower in a wavelength region longer than the wavelength of absorption edge.

Example 5

To a solution of 2.8 g of 4,4'-diaminoazobenzene in 240 ml of acetic acid was added dropwise a solution of 2 g of sodium nitrite in 25 ml sulfuric acid at 5° C. or lower. Water-ethanol (1:1) mixed solution (500 ml) at 5° C. or lower was added thereto. Further, a saturated aqueous solution of sodium acetate was added to adjust the solution to pH=4. At 0° C., a solution of 7 g of N-ethyl-N-(2-hydroxyethyl)-m-toluidine in 20 ml of ethanol was poured in the mixture. The mixture was allowed to react overnight while lowering the reaction temperature gradually down to room temperature. Ethanol was distilled off under reduced pressure to form precipitate. The precipitate was isolated and purified with column chromatography (carrier: dry silica gel; solvent: chloroform) to obtain 200 mg of 4,4'-bis[(p-(N-ethyl-N-ethanol)amino-o-methylphenyl)azo]-azobenzene (high $\chi^{(3)}$ compound C). Equimolar amounts of 4,4'-bis[(p-(N-ethyl-N-ethanol) amino-o-methylpheny)azo]-azobenzene and diphenylmethane diisocyanate were dissolved in THF, to which were added triethylamine, and di-n-butyltin dilaurate. The mixture was stirred at room temperature for 4 hours and then heated under reflux for 5 hours while stirring. After being cooled, the reaction mixture was poured in a large amount of hexane to precipitate a polyurethane derivative, i.e., the objective nonlinear optical main chain polymer material. After being purified by reprecipitation, the polyurethane derivative was dissolved in anisole, and the anisole solution was coated on a quartz substrate to form a purple polyurethane thin film of 200 Angstroms thick. The $\chi^{(3)}$ value of the polyurethane thin film was obtained by THG-Maker Fringe method. The three-photon resonance $\chi^{(3)}$ of this material was about $10^{-10}$ esu. Also, the material had a propagation loss of 1 dB/cm or lower in a wavelength region longer than the wavelength of absorption edge.

Example 6

2,5-Dichloroterephthalaldehyde and at least double amount of 4-[(p-(N-ethyl-N-ethanol)aminophenyl)azo]-1-aminobenzene were dissolved in THF, and a catalytic amount of benzenesulfonic acid was added to the solution. The mixture was heated under reflux for 5 hours while stirring. After cooling, red crystals which precipitated were filtered and isolated and purified with column chromatography (carrier: dry silica gel, solvent: chloroform:ethyl acetate=3:1) to obtain 2,5-dichloroterephthalbis-[4-(p-(N-ethyl-N-ethanol)aminophenyl)azoaniline] (hereafter, referred to also as high $\chi^{(3)}$ compound E). Equimolar amounts of 2,5-dichloroterephthal-bis-[4-(p-(N-ethyl-N-ethanol)animophenyl)azoaniline] and hexamethylene diisocyanate were dissolved in THF, and triethylamine and di-n-butyltin dilaurate were added to the resulting solution. The mixture was stirred at room temperature for 4 hours and then heated under reflux for 5 hours while stirring. After being cooled, the reaction mixture was poured in a large amount of hexane to precipitate a polyurethane derivative, i.e., the objective nonlinear optical main chain polymer material. After being purified by reprecipitation, the polyurethane derivative was dissolved in anisole, and the anisole solution was coated on a quartz substrate to form a purple polyurethane thin film of 200 Angstroms thick. The $\chi^{(3)}$ value of the polyurethane thin film was obtained by THG-Maker Fringe method. The three-photon resonance $\chi^{(3)}$ of this material was about $10^{-10}$ esu. Also, the material had a propagation loss of 1 dB/cm or lower in a wavelength region longer than the wavelength of absorption edge.

Example 7

To a solution of 5.9 g of 4,4'-bis(p-amino-o-methylphenylazo)-azobenzene in 240 ml of dimethylformamide (DMF) was added dropwise a solution of 2 g of sodium nitrite in 25 ml sulfuric acid at 5° C. or lower. Water-ethanol (1:1) mixed solution (500 ml) at 5° C. or lower was added thereto. Further, a saturated aqueous solution of sodium acetate was added to adjust the solution to pH=4. At 0° C., a solution of 7 g of N-ethyl-N-(2-hydroxy-ethyl)-m-toluidine in 20 ml of ethanol was poured in the mixture. The mixture was allowed to react overnight while lowering the reaction temperature gradually down to room temperature. Ethanol was distilled off under reduced pressure to form precipitate. The precipitate was isolated and purified with column chromatography (carrier: dry silica gel; solvent: chloroform) to obtain 360 mg of 4,4'-bis{4-[(p-(N-ethyl-N-ethanol)amino-o-methyl-phenyl)azo]-2-methyl-phenylazo}-azobenzene (hereafter, referred to also as high $\chi^{(3)}$ compound F). Equimolar amounts of 4,4'-bis{4-[(p-(N-ethyl-N-ethanol)amino-o-methylphenyl)azo]-2-methylphenyl-azo}-azobenzene and diphenylmethane diisocyanate were dissolved in THF, and triethylamine and di-n-butyltin dilaurate were added to the resulting solution. The mixture was stirred at room temperature for 4 hours and then heated under reflux for 5 hours while stirring. After being cooled, the reaction mixture was poured in a large amount of hexane to precipitate a polyurethane derivative, i.e., the objective nonlinear optical main chain polymer material. After being purified by reprecipitation, the polyurethane derivative was dissolved in anisole, and the anisole solution was coated on a quartz substrate to form a violet polyurethane thin film of 200 Angstroms thick. The $\chi^{(3)}$ value of the polyurethane thin film was obtained by THG-Maker Fringe method. The three-photon resonance $\chi^{(3)}$ of this material was about $10^{-10}$ esu. Also, the material had a propagation loss of 1 dB/cm or lower in a wavelength region longer than the wavelength of absorption edge.

Example 8

To a solution of 10 parts of hexamethylene diisocyanate, 5 parts of 4,4'-bis[(p-(N-ethyl-N-ethanol)aminophenyl)azo]-azobenzene (high $\chi^{(3)}$ compound A), and 5 parts of hexanediol in THF were added triethylamine and di-n-butyltin dilaurate. The mixture was stirred at room temperature for 4 hours and then heated under reflux for 5 hours while stirring. After being cooled, the reaction mixture was poured in a large amount of hexane to precipitate a polyurethane derivative, i.e., the objective nonlinear optical main chain polymer material. After being purified by reprecipitation, the polyurethane derivative was dissolved in anisole, and the anisole solution was coated on a quartz substrate to form a purpole polyurethane thin film of 250 Angstroms thick. The $\chi^{(3)}$ value of the polyurethane thin film was obtained by THG-Maker Fringe method. The three-photon resonance $\chi^{(3)}$ of this material was about $10^{-10}$ esu. Also, the material had a propagation loss of 1 dB/cm or lower in a wavelength region longer than the wavelength of absorption edge.

Example 9

To a solution of 7.3 g of 4,4'-bis{4-[(p-amino-o-methylphenylazo)-2-methylphenylazo}-azobenzene in 240 ml of DMF was added dropwise a solution of 2 g of sodium nitrite in 25 ml sulfuric acid at 5° C. or lower. Water-ethanol (1:1) mixed solution (500 ml) at 5° C. or lower was added thereto. Further, a saturated aqueous solution of sodium acetate was added to adjust the solution to pH=4. At 0° C., a solution of 7 g of N-ethyl-N-(2-hydroxyethyl)-m-toluidine in 20 ml of ethanol was poured in the mixture. The mixture was allowed to react overnight while lowering the reaction temperature gradually down to room temperature. Ethanol was distilled off under reduced pressure to form precipitate. The precipitate was isolated and purified with column chromatography (carrier: dry silica gel; solvent: chloroform) to obtain 360 mg of octacyclic compound. (hereafter, referred to also as high $\chi^{(3)}$ compound G). Equimolar amounts of the octacyclic compound and diphenylmethane diisocyanate were dissolved in THF, and triethylamine and di-n-butyltin dilaurate were added to the resulting solution. The mixture was stirred at room temperature for 4 hours and then heated under reflux for 5 hours while stirring. After being cooled, the reaction mixture was poured in a large amount of hexane to precipitate a polyurethane derivative, i.e., the objective nonlinear optical main chain polymer material. After being purified by reprecipitation, the polyurethane derivative was dissolved in anisole, and the anisole solution was coated on a quartz substrate to form a violet polyurethane thin film of 200 Angstroms thick. The $\chi^{(3)}$ value of the polyurethane thin film was obtained by THG-Maker Fringe method. The three-photon resonance $\chi^{(3)}$ of this material was about $10^{-10}$ esu. Also, the material had a propagation loss of 1 dB/cm or lower in a wavelength region longer than the wavelength of absorption edge.

Example 10

The polyaddition reaction of the high $\chi^{(3)}$ compound A with hexamethylene diisocyanate described in Example 1 was repeated except that DMF was used in place of THF as a solvent to obtain the objective polymer material having the same structure as the product of Example 1 and film-forming properties superior to the product of Example 1.

Example 11

The polyaddition reaction of the high $\chi^{(3)}$ compound B with hexamethylene diisocyanate described in Example 2 was repeated except that DMF was used in place of THF as a solvent to obtain the objective polymer material having the same structure as the product of Example 2 and film-forming properties superior to the product of Example 2.

Example 12

The polyaddition reaction of the high $\chi^{(3)}$ compound C with hexamethylene diisocyanate described in Example 3 was repeated except that DMF was used in place of THF as a solvent to obtain the objective polymer material having the same structure as the product of Example 3 and film-forming properties superior to the product of Example 3.

Example 13

The polyaddition reaction of the high $\chi^{(3)}$ compound D with hexamethylene diisocyanate described in Example 4 was repeated except that DMF was used in place of THF as a solvent to obtain the objective polymer material having the same structure as the product of Example 4 and film-forming properties superior to the product of Example 4.

Example 14

Equimolar amounts of dicyclohexylcarbodiimide, high $\chi^{(3)}$ compound A, and adipic acid were dissolved in THF. The solution was stirred at room temperature for 5 minutes, and then 0.4 mole of dimethylaminopyridine was added thereto. The resulting mixture was was allowed to react overnight. A large amount of hexane was added to the reaction mixture, and the precipitate was filtered. The precipitate was dissolved in a large amount of hot chloroform and insoluble matter was removed by filtration. After chloroform was distilled off under reduced pressure and the residue was purified by reprecipitation, the residue was dissolved in anisole. The anisole solution thus obtained was coated on a quartz substrate to obtain a polyester thin film of 200 Angstroms thick. The $\chi^{(3)}$ value of the polyester thin film was obtained by THG-Maker Fringe method. The three-photon resonance $\chi^{(3)}$ of this material was about $10^{-10}$ esu. Also, the material had a propagation loss of 1 dB/cm or lower in a wavelength region longer than the wavelength of absorption edge.

Example 15

Equimolar amounts of high $\chi^{(3)}$ compound A and terephthalic acid were dissolved in THF in the presence of toluenesulfonic acid. The solution was heated under reflux for 60 hours. To successively remove water which formed during the reaction from the reaction system a Soxhlet extractor pipe containing phosphorus pentoxide as a dehydrating agent in a Soxhlet filter paper was inserted between the reaction vessel and the reflux condenser. After completion of the reaction, hexane was added to the reaction mixture, and the objective material which precipitated was collected by filtration. The precipitate was purified by reprecipitation, and dissolved in anisole. The anisole solution was coated on a quartz substrate to obtain a polyester thin film of 200 Angstroms thick. The $\chi^{(3)}$ value of the polyester thin film was obtained by THG-Maker Fringe method. The three-photon resonance $\chi^{(3)}$ of this material was about $10^{-10}$ esu. Also, the material had a propagation loss of 1 dB/cm or lower in a wavelength region longer than the wavelength of absorption edge.

Example 16

Equimolar amounts of dicyclohexylcarbodiimide, high $\chi^{(3)}$ compound B, and adipic acid were dissolved in anhydrous THF. The solution was stirred at room temperature for 5 minutes, and then 0.4 mole of dimethylaminopyridine was added thereto. The resulting mixture was was allowed to react overnight. A large amount of hexane was added to the reaction mixture, and the precipitate was filtered. The precipitate was dissolved in a large amount of hot chloroform and insoluble matter was removed by filtration. After chloroform was distilled off under reduced pressure and the residue was purified by reprecipitation, the residue was dissolved in anisole. The anisole solution thus obtained was coated on a quartz substrate to obtain a polyester thin film of 200 Angstroms thick. The $\chi^{(3)}$ value of the polyester thin film was obtained by THG-Maker Fringe method. The three-photon resonance $\chi^{(3)}$ of this material was about $10^{-10}$ esu. Also, the material had a propagation loss of 1 dB/cm or lower in a wavelength region longer than the wavelength of absorption edge.

Example 17

Equimolar amounts of dicyclohexylcarbodiimide, high $\chi^{(3)}$ compound C, and adipic acid were dissolved in anhydrous THF. The solution was stirred at room temperature for 5 minutes, and then 0.4 mole of dimethylaminopyridine was added thereto. The resulting mixture was was allowed to react overnight. A large amount of hexane was added to the reaction mixture, and the precipitate was filtered. The precipitate was dissolved in a large amount of hot chloroform and insoluble matter was removed by filtration. After chloroform was distilled off under reduced pressure and the residue was purified by reprecipitation, the residue was dissolved in anisole. The anisole solution thus obtained was coated on a quartz substrate to obtain a polyester thin film of 200 Angstroms thick. The $\chi^{(3)}$ value of the polyester thin film was obtained by THG-Maker Fringe method. The three-photon resonance $\chi^{(3)}$ of this material was about $10^{-10}$ esu. Also, the material had a propagation loss of 1 dB/cm or lower in a wavelength region longer than the wavelength of absorption edge.

Example 18

Equimolar amounts of high $\chi^{(3)}$ compound C and terephthalic acid were dissolved in THF in the presence of toluenesulfonic acid. The solution was heated under reflux for 60 hours. To successively remove water which formed during the reaction from the reaction system a Soxhlet extractor pipe containing phosphorus pentoxide as a dehydrating agent in a Soxhlet filter paper was inserted between the reaction vessel and the reflux condenser. After completion of the reaction, hexane was added to the reaction mixture, and the objective material which precipitated was collected by filtration. The precipitate was purified by reprecipitation, and dissolved in anisole. The anisole solution was coated on a quartz substrate to obtain a polyester thin film of 200 Angstroms thick. The $\chi^{(3)}$ value of the polyester thin film was obtained by THG-Maker Fringe method. The three-photon resonance $\chi^{(3)}$ of this material was about $10^{-10}$ esu. Also, the material had a propagation loss of 1 dB/cm or lower in a wavelength region longer than the wavelength of absorption edge.

Example 19

Equimolar amounts of dicyclohexylcarbodiimide, high $\chi^{(3)}$ compound D, and adipic acid were dissolved in anhydrous THF. The solution was stirred at room temperature for 5 minutes, and then 0.4 mole of dimethylaminopyridine was added thereto. The resulting mixture was was allowed to react overnight. A large amount of hexane was added to the reaction mixture, and the precipitate was filtered. The precipitate was dissolved in a large amount of hot chloroform and insoluble matter was removed by filtration. After chloroform was distilled off under reduced pressure and the residue was purified by reprecipitation, the residue was dissolved in anisole. The anisole solution thus obtained was coated on a quartz substrate to obtain a polyester thin film of 200 Angstroms thick. The $\chi^{(3)}$ value of the polyester thin film was obtained by THG-Maker Fringe method. The three-photon resonance $\chi^{(3)}$ of this material was about $10^{-10}$ esu. Also, the material had a propagation loss of 1 dB/cm or lower in a wavelength region longer than the wavelength of absorption edge.

Example 20

Equimolar amounts of dicyclohexylcarbodiimide, high $\chi^{(3)}$ compound F, and adipic acid were dissolved in anhydrous THF. The solution was stirred at room temperature for 5 minutes, and then 0.4 mole of dimethylaminopyridine was added thereto. The resulting mixture was was allowed to react overnight. A large amount of hexane was added to the reaction mixture, and the precipitate was filtered. The precipitate was dissolved in a large amount of hot chloroform and insoluble matter was removed by filtration. After chloroform was distilled off under reduced pressure and the residue was purified by reprecipitation, the residue was dissolved in anisole. The anisole solution thus obtained was coated on a quartz substrate to obtain a polyester thin film of 200 Angstroms thick. The $\chi^{(3)}$ value of the polyester thin film was obtained by THG-Maker Fringe method. The three-photon resonance $\chi^{(3)}$ of this material was about $10^{-10}$ esu. Also, the material had a propagation loss of 1 dB/cm or lower in a wavelength region longer than the wavelength of absorption edge.

Example 21

To a solution of 2.8 g of 4,4'-diaminoazobenzene in 240 ml of acetic acid was added dropwise a solution of 2 g of sodium nitrite in 25 ml sulfuric acid at 5° C. or lower. Water-ethanol (1:1) mixed solution (500 ml) at 5° C. or lower was added thereto. Further, a saturated aqueous solution of sodium acetate was added to adjust the solution to pH=4. At 0° C., a solution of 6.5 g of m-(N-ethyl-N-ethanol)aminophenol in 20 ml of ethanol was poured in the mixture. The mixture was allowed to react overnight while lowering the reaction temperature gradually down to room temperature. Ethanol was distilled off under reduced pressure to form precipitate. The precipitate was isolated and purified with column chromatography (carrier: dry silica gel; solvent: chloroform) to obtain 240 mg of 4,4'-bis[(p-(N-ethyl-N-ethanol)amino-o-hydroxyphenyl)azo]-azobenzene (hereafter, referred to also as high $\chi^{(3)}$ compound H). Equimolar amounts of 4,4'-bis[(p-(N-ethyl-N-ethanol)amino-o-hydroxyphenyl)azo]-azobenzene and hexamethylene diisocyanate were dissolved in THF, and triethylamine, and di-n-butyltin dilaurate were added to the resulting solution. The mixture was stirred at room temperature for 4 hours and then heated under reflux for 5 hours while stirring. After being cooled, the reaction mixture was poured in a large amount of hexane to precipitate a polyurethane derivative, i.e., the objective nonlinear optical main chain polymer material. After being purified by reprecipitation, the polyurethane derivative was dissolved in anisole, and the anisole solution was coated on a quartz substrate to form a purple polyurethane thin film of 200 Angstroms thick. The $\chi^{(3)}$ value of the polyurethane thin film was obtained by THG-Maker Fringe method. The three-photon resonance $\chi^{(3)}$ of this material was about $10^{-10}$ esu. Also, the material had a propagation loss of 1 dB/cm or lower in a wavelength region longer than the wavelength of absorption edge.

Example 22

To a solution of 6.3 g of 4,4'-diaminostilbene-2,2'-disulfonic acid in 240 ml of acetic acid was added dropwise a solution of 2 g of sodium nitrite in 25 ml sulfuric acid at 5° C. or lower. Water-ethanol (1:1) mixed solution (500 ml) at 5° C. or lower was added thereto. Further, a saturated aqueous solution of sodium acetate was added to adjust the solution to pH=4. At 0° C., a solution of 6 g of N-ethyl-N-ethanolaniline in 20 ml of ethanol was poured in the mixture. The mixture was allowed to react overnight while lowering the reaction temperature gradually down to room temperature. Ethanol was distilled off under reduced pressure to form precipitate. The precipitate was isolated and purified with column chromatography (carrier: dry silica gel; solvent: chloroform) to obtain 280 mg of 4,4'-bis[(p-(N-ethyl-N-ethanol)aminophenyl)azo]-stilbene-2,2'-disulfonic acid (hereafter, referred to also as high $\chi^{(3)}$ compound I). Equimolar amounts of 4,4'-bis[(p-(N-ethyl-N-ethanol)aminophenyl)azo]-stilbene-2,2'-disulfonic acid and hexamethylene diisocyanate were dissolved in THF, and triethylamine, and di-n-butyltin dilaurate were added to the resulting solution. The mixture was stirred at room temperature for 4 hours and then heated under reflux for 5 hours while stirring. After being cooled, the reaction mixture was poured in a large amount of hexane to precipitate a polyurethane derivative, i.e., the objective nonlinear optical main chain polymer material. After being purified by reprecipitation, the polyurethane derivative was dissolved in anisole, and the anisole solution was coated on a quartz substrate to form a purple polyurethane thin film of 200 Angstroms thick. The $\chi^{(3)}$ value of the polyurethane thin film was obtained by THG-Maker Fringe method. The three-photon resonance $\chi^{(3)}$ of this material was about $10^{-10}$ esu. Also, the material of 1 μm thick had a propagation loss of 1 dB/cm or lower.

Example 23

To a solution of 3.6 g of 4,4'-diaminostilbene in 240 ml of acetic acid was added dropwise a solution of 2 g of sodium nitrite in 25 ml sulfuric acid at 5° C. or lower.

Water-ethanol (1:1) mixed solution (500 ml) at 5° C. or lower was added thereto. Further, a saturated aqueous solution of sodium acetate was added to adjust the solution to pH=4. At 0° C., a solution of 6.5 g of m-(N-ethyl-N-ethanol)aminoaniline in 20 ml of ethanol was poured in the mixture. The mixture was allowed to react overnight while lowering the reaction temperature gradually down to room temperature. Ethanol was distilled off under reduced pressure to form precipitate. The precipitate was isolated and purified with column chromatography (carrier: dry silica gel; solvent: chloroform) to obtain 230 mg of 4,4'-bis[(p-(N-ethyl-N-ethanol)amino-o-aminophenyl)azo]-stilbene (hereafter, referred to also as high $\chi^{(3)}$ compound J). Equimolar amounts of 4,4'-bis[(p-(N-ethyl-N-ethanol)amino-o-aminophenyl)azo]-stilbene and hexamethylene diisocyanate were dissolved in THF, and triethylamine, and di-n-butyltin dilaurate were added to the resulting solution The mixture was stirred at room temperature for 4 hours and then heated under reflux for 5 hours while stirring. After being cooled, the reaction mixture was poured in a large amount of hexane to precipitate a polyurethane derivative, i.e., the objective nonlinear optical main chain polymer material. After being purified by reprecipitation, the polyurethane derivative was dissolved in anisole, and the anisole solution was coated on a quartz substrate to form a purple polyurethane thin film of 200 Angstroms thick. The $\chi^{(3)}$ value of the polyurethane thin film was obtained by THG-Maker Fringe method. The three-photon resonance $\chi^{(3)}$ of this material was about $10^{-10}$ esu. Also, the material had a propagation loss of 1 dB/cm or lower in a wavelength region longer than the wavelength of absorption edge.

TABLE

| | MOLECULAR STRUCTURE OF HIGH $\chi^{(3)}$ COMPOUND | EXAMPLE |
|---|---|---|
| A | HOCH$_2$CH$_2$(CH$_3$CH$_2$)N–C$_6$H$_4$–N=N–C$_6$H$_4$–N=N–C$_6$H$_4$–N(CH$_2$CH$_3$)(CH$_2$CH$_2$OH) | 1,8,10, 14,15 |
| B | HOCH$_2$CH$_2$(CH$_3$CH$_2$)N–C$_6$H$_4$–N=N–C$_6$H$_4$–CH=CH–C$_6$H$_4$–N(CH$_2$CH$_3$)(CH$_2$CH$_2$OH) | 2,11,16 |
| C | HOCH$_2$CH$_2$(CH$_3$CH$_2$)N–C$_6$H$_3$(CH$_3$)–N=N–C$_6$H$_4$–N=N–C$_6$H$_3$(CH$_3$)–N(CH$_2$CH$_3$)(CH$_2$CH$_2$OH) | 3,5,12, 17,18 |
| D | HOCH$_2$CH$_2$(CH$_3$CH$_2$)N–C$_6$H$_4$–N=N–C$_6$H$_3$(Cl)–N=N–C$_6$H$_3$(Cl)–N(CH$_2$CH$_3$)(CH$_2$CH$_2$OH) | 4,13,19 |
| E | HOCH$_2$CH$_2$(CH$_3$CH$_2$)N–C$_6$H$_4$–CH=N–C$_6$H$_2$(Cl)$_2$–N=CH–C$_6$H$_4$–N(CH$_2$CH$_3$)(CH$_2$CH$_2$OH) | 6 |
| F | HOCH$_2$CH$_2$(CH$_3$CH$_2$)N–C$_6$H$_3$(CH$_3$)–N=N–C$_6$H$_3$(CH$_3$)–N=N–C$_6$H$_3$(CH$_3$)–N=N–C$_6$H$_3$(CH$_3$)–N(CH$_2$CH$_3$)(CH$_2$CH$_2$OH) | 7,20 |
| G | HOCH$_2$CH$_2$(CH$_3$CH$_2$)N–C$_6$H$_3$(CH$_3$)–N=N–C$_6$H$_3$(CH$_3$)–N=N–C$_6$H$_3$(CH$_3$)–N=N–C$_6$H$_3$(CH$_3$)–N=N–C$_6$H$_3$(CH$_3$)–N(CH$_2$CH$_3$)(CH$_2$CH$_2$OH) | 9 |

TABLE-continued

MOLECULAR STRUCTURE OF HIGH $\chi^{(3)}$ COMPOUND

| | Structure | EXAMPLE |
|---|---|---|
| H | HOCH$_2$CH$_2$\N-C$_6$H$_3$(OH)-N=N-C$_6$H$_4$-N=N-C$_6$H$_4$-N=N-C$_6$H$_3$(OH)-N(CH$_2$CH$_3$)(CH$_2$CH$_2$OH) with CH$_3$CH$_2$ on left N | 21 |
| I | HOCH$_2$CH$_2$\N-C$_6$H$_4$-N=N-C$_6$H$_3$(SO$_3$H)-CH=CH-C$_6$H$_3$(SO$_3$H)-N=N-C$_6$H$_4$-N(CH$_2$CH$_3$)(CH$_2$CH$_2$OH) with CH$_3$CH$_2$ on left N | 22 |
| J | HOCH$_2$CH$_2$\N-C$_6$H$_3$(NH$_2$)-N=N-C$_6$H$_4$-CH=CH-C$_6$H$_4$-N=N-C$_6$H$_3$(NH$_2$)-N(CH$_2$CH$_3$)(CH$_2$CH$_2$OH) with CH$_3$CH$_2$ on left N | 23 |

WHAT IS CLAIMED IS:

1. A third-order nonlinear optical main chain polymer material comprising:
   an organic polymer main chain selected from the group consisting of polyurethane main chain and polyester main chain; and
   a $\chi^{(3)}$ component connected at both ends thereof to said polymer main chain through covalent bonds so that said polymer main chain is interrupted by said $\chi^{(3)}$ component, said $\chi^{(3)}$ component having no less than 3 but no more than 7 $\pi$-conjugated bonding groups and having ends each substituted with an electron donor group;
   said $\chi^{(3)}$ component being represented by formula (I) below:

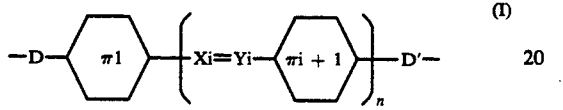
(I)

wherein D and D', which are the same or different, each represent an electron donor; rings represented by

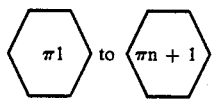

each represent a $\pi$-electron conjugated ring selected from the group consisting of a benzene ring, a thiophene ring, and a furan ring; Xi and Yi, which are the same or different, each represent N or CH, with —Xi=Yi— representing a $\pi$-conjugated bonding group; i is a positive integer of 1 to n; and n is a positive integer of 3 to 7.

2. A third-order nonlinear optical main chain polymer material as claimed in claim 1, wherein said electron donor represented by D or D' is an alkylamino structure.

3. A third-order nonlinear optical main chain polymer material as claimed in claim 1, wherein said electron donor represented by D or D' is a dialkylamino structure.

4. A third-order nonlinear optical main chain polymer material as claimed in claim 1, wherein said electron donor represented by D or D' is a diethylamino structure.

5. A third-order nonlinear optical main chain polymer material as claimed in claim 1, wherein said $\pi$-conjugated bonding group is —N=N—.

6. A third-order nonlinear optical main chain polymer material as claimed in claim 1, wherein said $\chi^{(3)}$ component is substituted with at least one substituent selected from the class consisting of a methyl group, a chlorine atom, a hydroxyl group, a sulfonic group, and an amino group.

7. A third-order nonlinear optical main chain polymer material as claimed in claim 1, wherein said $\chi^{(3)}$ component is centrosymmetric.

8. A third-order nonlinear optical main chain polymer material as claimed in claim 1, wherein said $\pi$-conjugated bonding is —CH=CH—.

9. A third-order nonlinear optical main chain polymer material as claimed in claim 1, wherein said $\pi$-conjugated bonding is —N=CH—.

10. A third-order nonlinear optical main chain polymer material as claimed in claim 1, wherein said organic polymer main chain is polyester main chain.

11. A third-order nonlinear optical main chain polymer material as claimed in claim 1, wherein said organic polymer main chain is polyurethane main chain.

12. A third-order nonlinear optical main chain polymer material comprising:
    an organic polymer main chain selected from the group consisting of polyurethane main chain and polyester main chain; and
    a $\chi^{(3)}$ component connected at both ends thereof to said polymer main chain through covalent bonds so that said polymer main chain is interrupted by said $\chi^{(3)}$ component, said $\chi^{(3)}$ component having no less than 3 but no more than 7 $\pi$-conjugated bonding groups and having ends each substituted with an electron donor group;
    said $\chi^{(3)}$ component being represented by formula (I) below:

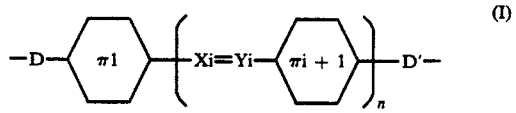
(I)

wherein D and D', which are same or different, each represent an electron donor; rings represented by

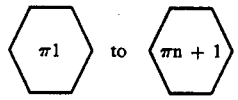

each represent a benzene ring; Xi and Yi, which are same or different, each represent N or CH, with —Xi=Yi— representing a $\pi$-conjugated bonding group; i is a positive integer of 1 to n; and n is a positive integer of 3 to 7.

13. A third-order nonlinear optical main chain polymer material as claimed in claim 12, wherein said electron donor represented by D or D' is an alkylamino structure.

14. A third-order nonlinear optical main chain polymer material as claimed in claim 12, wherein said electron donor represented by D or D' is a dialkylamino structure.

15. A third-order nonlinear optical main chain polymer material as claimed in claim 12, wherein said electron donor represented by D or D' is a diethylamino structure.

16. A third-order nonlinear optical main chain polymer material as claimed in claim 12, wherein said $\pi$-conjugated bonding is —N=N—.

17. A third-order nonlinear optical main chain polymer material as claimed in claim 12, wherein said $\pi$-conjugated bonding is —CH=CH—.

18. A third-order nonlinear optical main chain polymer material as claimed in claim 12, wherein said $\pi$-conjugated bonding is —N=CH—.

19. A third-order nonlinear optical main chain polymer material as claimed in claim 12, wherein said $\chi^{(3)}$ component is substituted with at least one substituent selected from the group consisting of a methyl group, a chlorine atom, a hydroxyl group, a sulfonic group, and an amino group.

20. A third-order nonlinear optical main chain polymer material as claimed in claim 12, wherein said organic polymer main chain is polyester main chain.

21. A third-order nonlinear optical main chain polymer material as claimed in claim 12, wherein said organic polymer main chain is polyurethane main chain.

22. A third-order nonlinear optical main chain polymer material as claimed in claim 12, wherein said $\chi^{(3)}$ component is centrosymmetric.

* * * * *